United States Patent
Kantamneni

(10) Patent No.: US 8,108,800 B2
(45) Date of Patent: Jan. 31, 2012

(54) CALCULATING COGNITIVE EFFICIENCY SCORE FOR NAVIGATIONAL INTERFACES BASED ON EYE TRACKING DATA

(75) Inventor: Raj Gopal Prasad Kantamneni, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1173 days.

(21) Appl. No.: 11/778,378

(22) Filed: Jul. 16, 2007

(65) Prior Publication Data

US 2009/0024964 A1    Jan. 22, 2009

(51) Int. Cl.
*G06F 3/033* (2006.01)

(52) U.S. Cl. ........ 715/863; 715/854; 351/223; 351/224; 351/227; 351/237; 351/239

(58) Field of Classification Search .................. 715/863
See application file for complete search history.

(56) References Cited

U.S. PATENT DOCUMENTS

| | | | |
|---|---|---|---|
| 7,120,880 B1 * | 10/2006 | Dryer et al. | 715/863 |
| 2006/0048189 A1 * | 3/2006 | Park et al. | 725/46 |
| 2007/0147661 A1 * | 6/2007 | Fukaya et al. | 382/104 |
| 2007/0218439 A1 * | 9/2007 | Delahunt et al. | 434/236 |

* cited by examiner

*Primary Examiner* — Boris Pesin
*Assistant Examiner* — Andreas E Gutierrez
(74) *Attorney, Agent, or Firm* — Hickman Palermo Truong & Becker LLP

(57) ABSTRACT

A method and apparatus for computing efficiency score of a page is provided and using the efficiency score to optimize page design. Eye tracking study is performed on a group of subjects where eye fixation data, gaze plot data, and qualitative information data are collected. Fixation information data for page is aggregated over the subjects in the study. The fixation information data is divided into a grid. Number of fixations is computed for every grid element. Seen and noticed thresholds are established for every grid element. Seen and noticed area of a page is computed by counting number of grid elements falling into either threshold. Ratio of area noticed over area seen is computed to yield efficiency score. Page fixation data are compared for alternate page designs. Areas of large difference are correlated with gaze plots and qualitative data to identify distinguishing features.

12 Claims, 4 Drawing Sheets

CALCULATING COGNITIVE EFFICIENCY SCORE FOR NAVIGATIONAL INTERFACES BASED ON EYE TRACKING DATA

FIELD OF THE INVENTION

The present invention relates to techniques for evaluation of navigational interfaces.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Competing commercial web sites such as search engines constantly strive to differentiate from each other in order to attract users. The user base of a site has a direct bearing on advertisement revenue and hence profitability of a site. Site designers continuously monitor user opinions of web sites such as whether a particular search engine has more relevant information than another, whether a given web site is better, or whether a given web site design layout is cleaner. While an editorial team can easily perform an information relevancy analysis for search engine results, the outcome of the relevancy analysis does not necessarily track user opinion. The disparity in user opinion and relevancy is explained by features related to perception that lead to opinions like "better" and "design layout is cleaner." Perception-related features contribute to long term user satisfaction, which affects the number of users of the site and consequently receive attention from site designers.

A user will devote only up to a fixed amount of time to the perception of a given page. If a user is unable to find what he or she wants within a given time budget, then the user will move on from the page. This indicates that the efficiency with which a user is able to absorb information from a given page contributes to user satisfaction.

Publishers, in a drive to increase user satisfaction, attempt to understand how various design features affect user perception of a page. Publishers also want to mitigate the risk associated with introducing new page designs. Publishers use a number of approaches to mitigate risk, such as collecting live statistics, conducting surveys, running usability studies, performing eye-tracking studies. However, none of the approaches attempt to measure how efficiently users process information on a page. In other words, none of the approaches measures the cognitive efficiency of a page.

User requirements for web pages depend on the primary purpose of a given page. Web pages can be divided into two classes: informational and navigational. Informational pages are intended to be the end point of a search. For example, if a user searches for information regarding a certain high blood pressure drug, and arrives at a page that contains the needed information, then the user will stay at the page for an extended period of time and absorb the information. A navigational page is built with the primary purpose to redirect the user to his intended destination. A typical example of a navigational page is a results page generated by a search engine.

A common metric for informational and navigational pages is how much time a user spends at each. A designer of an informational page strives to maximize the time a user spends on the page. Prolonged time indicates that the page's content is of interest. However, for navigational pages, time spent on the page should be minimized, so that the user is able to move to the intended destination as quickly as possible.

Search engine publishers or designers collect various live data, such as query logs, mouse click data, click-through rate, and data about how long users stay on a particular page. Publishers and designers collect this data in order to gain insight into user behavior and into factors contributing to user satisfaction. Click-through rate, or "CTR," is a measure of online advertisement effectiveness.

CTR is a ratio of (a) the number of clicked-on advertisements to (b) the number of advertisements that were shown. CTR is directly tied to the advertisement revenue. CTR can only quantify performance of a particular design at an aggregate level and yields no information on what bearing each element of the design has on the user. Query logs, correlated with mouse clicks, can be used to examine the effectiveness of information presentation; however, query logs provide limited insight because users submitting the queries are not readily identifiable. In the instances where users are identifiable, users most often are unable to articulate their exact thought process for a particular mouse click. A mouse click on a search engine page is a result of a number of decisions made by the user, such as a decision about whether the abstract was meaningful or whether the title was interesting.

Structured experiments have also been used to study and characterize the impact of page design on perception. Some common approaches include asking users to detail their thought processes as they are using the search engine interface. Another approach involves using surveys. Most recently, eye-tracking studies have been conducted. However, having a study participant describe his thought process while looking at a page heavily affects the experiment. Typically, the time that passes before a user's first click in a search page is in the order of seconds. Vocalization inevitably slows down the study participant's decision-making process, which allows the study participant to notice extra visual cues. Administering surveys to a user after the user has navigated through several pages also presents problems, such as lack of user motivation and lack of user memory. If users are provided items for which to search, then the users are often unmotivated and less likely to spend time performing the search. As a result, searches are finished in a shorter time frame. User memory becomes an issue because if the user makes a rapid series of decisions before clicking on a link, then the user will not remember some of the decisions. Consequently, the user's decisions become impossible to capture in a survey.

As is mentioned above, eye tracking is a technique that is used to study how a user perceives a given page. A typical, non-invasive eye-tracking system uses an infrared light source and a special video-recording device to measure reflections that are present on the eye. This measurement is performed to gauge the eye's precise position. The human eye is structured in a way such that objects are seen in a very small area of a focus point. Objects outside of the focus point appear to the observer as though the observer were looking through a frosted glass; the detail is filled in by the brain. The human eye is able to detect motion and certain patterns in the eye's periphery. Studies of perception based on eye tracking use the small focus point and operate on the assumption that what a user is seeing, the user is also thinking about.

There are several types of data that may be derived from eye-tracking studies, gaze plots, mouse click locations, and fixation data which is transformed into page heat maps. Eye-tracking systems record the position of a user's focus point as the user is looking at pages. The eye-tracking system correlates the focus point information with what the user sees on a computer monitor and mouse movement. The eye-tracking system is integrated with the computer's Internet browser. The eye-tracking system is able to determine which portion of the page at which a user has been looking even if the user scrolled up or down the page. That way, the eye-tracking data can be combined with respect to a common reference point.

In order to perceive a web page in its entirety, users scan the page using rapid eye movements, thereby moving the focus point rapidly. The movement of the focus point is recorded by the eye-tracking system. The recorded path is called a gaze plot. As a user is scanning a page, the user's eyes tend to seek out the most interesting part of the visual input. The eyes focus on the most dynamic part, while the rest of the picture is filled in by the brain. The eyes, when changing the position of the focus point, enter a ballistic state. In transit, or ballistic state, the eyes are not capturing any information. Information capture restarts once the focus point stops moving. The complete movement is captured by the eye-tracking system. When a focus point remains stationary for a predetermined period of time, the eyes are said to have fixated on a point. The predetermined period of time is called a fixation. If the focus point remains stationary for multiple predetermined periods of time, then the focus point remains stationary for multiple fixations. A fixation is a finite element of time that one spends looking at a single point. For example, if a fixation were assigned a value of $1/16$ of a second and if a person were to look at a point for $1/8$ of a second, then the person would have looked at the point for a duration of 2 fixations A page heat map is a visualization of all eye fixations for a page aggregated across multiple people. The time during which the eye is stationary is counted in finite increments or fixations. In a heat map, a different color is assigned to a certain part of the page based on the number of fixations. A graduated color scale can be used to visualize the fixations. A color scale can be arbitrarily assigned, for example with colors ranging from blue to red. Areas of red indicate a higher number of fixations received by the area, and imply that people spent a longer time looking at the area. Areas of blue indicate that the area received few fixations, and correspondingly fewer people spent time looking at the areas of blue.

There are two possible extremes for heat maps. At one extreme, a user's fixations can be spread uniformly over the entirety of the page, which indicates that the page was seen but not much was specifically noticed. At the other extreme is a web page that contains areas of highly concentrated fixations, while other portions of the page have no fixations at all. In that case, content on the page was noticed in the areas of high concentration of fixations, but content was not even seen in other portions of the page.

A large advantage of eye-tracking systems is that a user is able to search naturally, without slowing down. The user is able to make decisions without talking. At the end of a search session, the eye tracker produces a time-correlated set of data which includes a video log, the pages visited, mouse clicks, and eye-tracking data. Using the combined data, a study participant can be questioned to gain insight into his thought process.

All of the current approaches provide limited information. Currently, data generated by eye-tracking systems is used to obtain qualitative data regarding specific design elements. The eye-tracking data is used to answer questions such as "where did people look?" and "how did the gaze progress across the page?" The questions provide a localized view of the page's layout design and cannot be used to predict accurately behavior of larger groups of users, specifically (a) how a users will perceive a web page, (b) overall user satisfaction, or (c) the possible CTR. Live data, such as CTR along with raw revenue, can provide a much coarser quantitative metric of design performance but does not provide concrete data on how a user perceives a given page's layout design, and does not yield information about the effect of individual design elements. There exists a need for an automatically derivable metric that measures how users perceive web pages.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A method and apparatus for computing a cognitive efficiency score of a user interface is provided. The cognitive efficiency score may be used to optimize page design. A cognitive efficiency score is a measurement of how a particular page's layout design, or a particular page's interface design, manages a user's attention. In order to derive a cognitive efficiency score, an eye-tracking study is performed on a group of subjects. In the study, eye fixation data, gaze plot data, and qualitative information are collected. Fixation data for a page is aggregated over the subjects in the study. The fixation data is divided into a grid. A number of fixations are computed for every grid element. Seen and noticed thresholds are assigned. Seen and noticed areas of a page are computed. The ratio of the area noticed over the area seen is computed to yield the cognitive efficiency score. Page fixation data are compared for alternate page designs. Areas of large difference are correlated with gaze plots and qualitative data to identify distinguishing features.

Deriving Cognitive Efficiency Scores from Eye-Tracking Data

Figure 1:
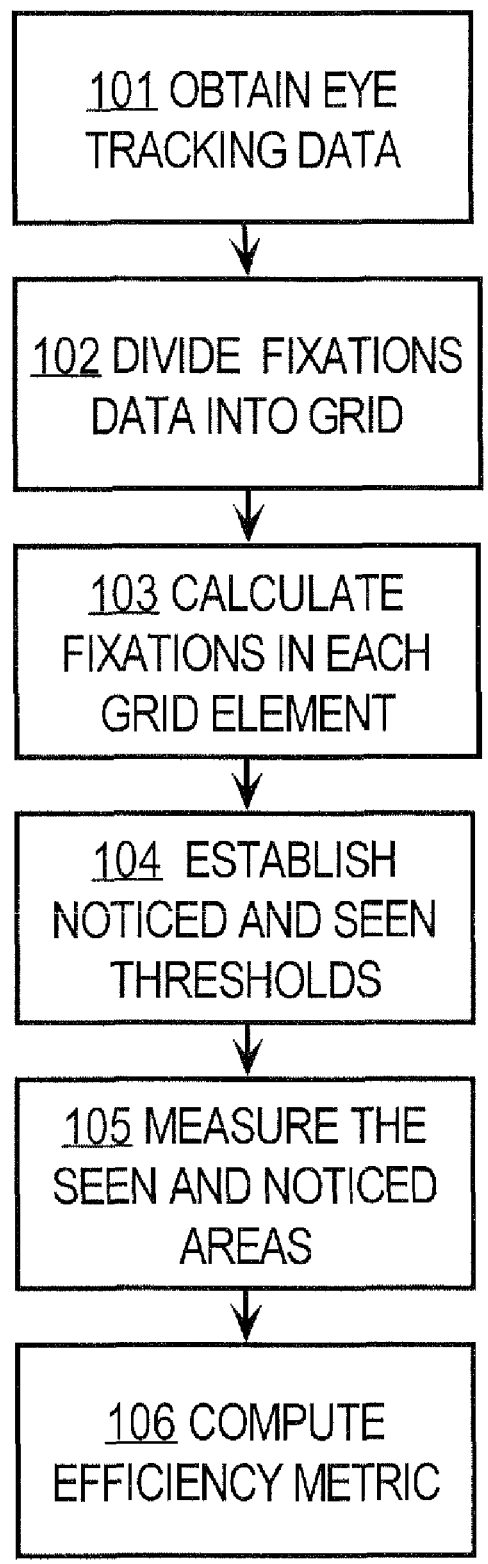
FIG. 1 is a flow diagram of a cognitive efficiency score derivation technique, according to an embodiment of the current invention.

In one embodiment of the invention, the cognitive efficiency score of a page is calculated as follows. FIG. 1 is a flow diagram of a cognitive efficiency score derivation technique, according to an embodiment of the invention. Given a page layout design, an eye-tracking study is performed in step 101. In an embodiment of the current invention, an eye-tracking study captures fixation, gaze plot, and survey data. The fixation data for a particular page layout design is aggregated over all the users in the study. The fixation data (e.g., represented by a heat map that illustrates the amount of aggregated fixations that various parts of the page received) is then divided, in step 102, into a grid. The grid elements can be square in shape. In an alternate embodiment, the grid elements can be rectangular or hexagonal. The number of fixations inside each grid element is then computed in step 103. Two thresholds for categories "seen" and "noticed" are established in step 104. "Seen" and "noticed" category thresholds are two levels of fixations for a grid element. An element that is "seen" is not actively perceived by the brain, and hence a user spent less than a predetermined amount of time examining that element. In contrast, an element that is "noticed" is actively perceived by the brain; the user spent more time looking at that element. An intuitive example of difference between "seen" and "noticed" may be understood by imagining a hypothetical user sitting at a room reading a computer screen on a laptop while there is a wall thermostat in the user's field of view. The area of the screen that the user is currently reading is actively perceived by the user and hence is "noticed," while the thermostat, even though it is in the user's field of view, is not perceived, and hence is only "seen." In an embodiment of the present invention, any grid element to which the user has devoted up to one fixation of the user's attention is considered to be a grid element that the user has seen. In contrast, if a user's gaze is fixed at a grid element for a duration of more than a certain threshold of fixations, then the user is considered to have noticed that grid element. In another embodiment of the current invention thresholds for categories "seen" and "noticed" are established by correlating the number of fixations at an area of a page with the probability of getting a click at that area of a page. The "noticed" category threshold is set at a number of fixations at which the probably of getting a click is sufficiently high. The "seen" category threshold is set at least one fixation but less than the "noticed" category threshold number of fixations. Total areas taken up by "seen" grid elements and by "noticed" grid elements are measured in step 105. The areas can be computed by simply counting the number of grid elements falling into "seen" and "noticed" categories. A cognitive efficiency score is computed in step 106. In an embodiment of the invention, the cognitive efficiency score is the ratio of (a) the area noticed over (b) the area seen. Because users expend a fixed amount of effort to browse a web page, the cognitive efficiency score serves as an indicator of how much of the user's effort will result in finding something that is of interest to the user.

Alternative Cognitive Efficiency Score Calculation

Users may have multiple intents when searching for something. For example, a navigational intent may be exhibited when a user types in a key word "Yahoo" with the intent to go to the Yahoo homepage. On the other hand, an informational intent is exhibited when a user types in "Yahoo" with the intent of finding the name of the CEO of the company. Users typically demonstrate a multitude of intents when they seek information. The classification for each query is determined based on statistics kept by the search engine correlating a query to which type of page the majority of users would navigate to after performing a query.

The cognitive efficiency score of a given search page for each query class can differ significantly from each other, therefore distribution of query classes in a given study affects the cognitive efficiency score.

Controlling how much a cognitive efficiency score of a particular query class for a particular page layout design contributes to the overall cognitive efficiency score of a particular layout page design can be used to more accurately approximate the cognitive efficiency score of a live search page. In an alternative embodiment the cognitive efficiency score is calculated as follows. Query terms for a study with few participants and query terms contained in the logs are categorized along the same classes. For example the classes can be navigational, informational and resource. The proportion of query terms taken up by individual search class with respect to all the query terms in the logs is determined. Cognitive efficiency score for a page layout design for individual query term classes is determined from the study with few participants. The overall cognitive efficiency score for a page layout design is then calculated by using the proportions of query term classes derived from log data to weigh the proportions of each query term class in the study.

Figure 2:
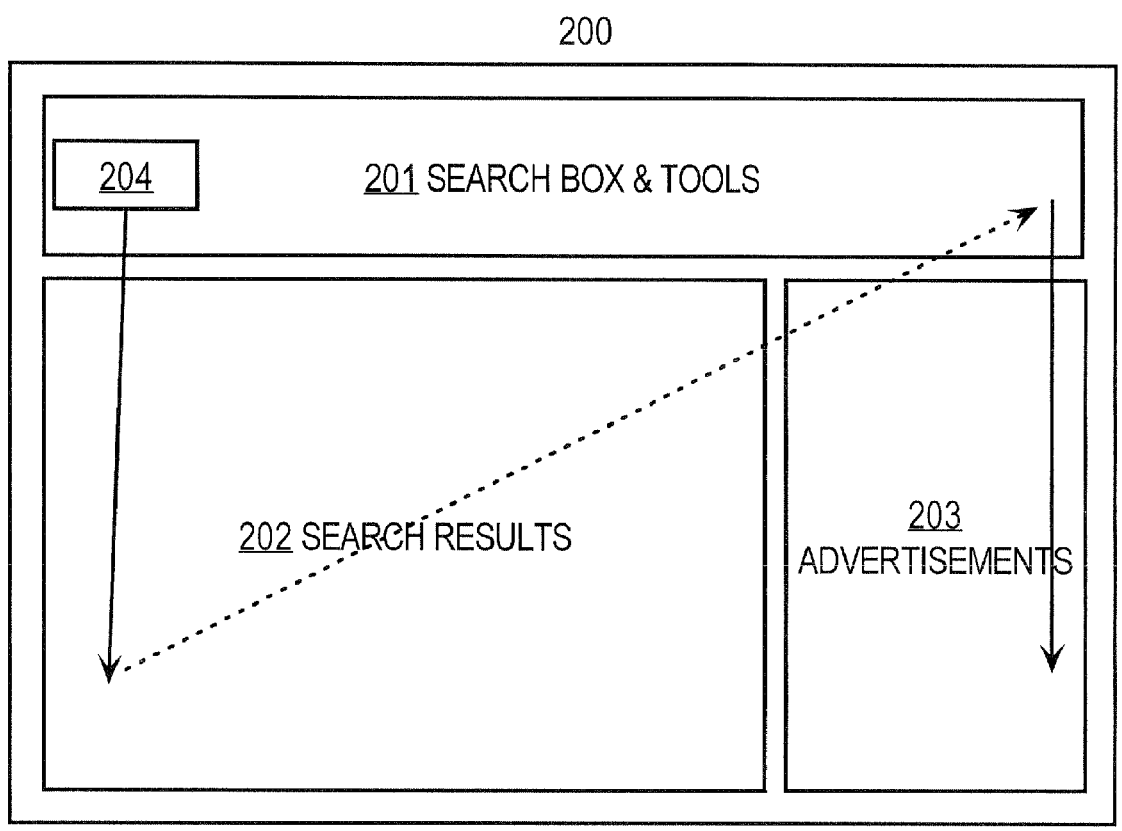
FIG. 2 is flow diagram of an iterative page design technique driven by the discovery of focus-effecting features, according to an embodiment of the current invention.

In another embodiment, instead of calculating cognitive efficiency score for an entire page, cognitive efficiency score is calculated for individual page layout elements. FIG. 2 illustrates typical layout elements of a search results page and a sample aggregated gaze plot. Search results page 200 includes page layout elements, such as a search box and tools 201, list of search results 202, and related advertisements 203. A gaze plot aggregated from data from multiple users starts at point 204. The focus point starts its motion at search box 201, then the focus point slowly traverses the search results 202, goes ballistic to the upper right corner of search box 201, which is indicated by a dashed line, and then slowly traverses the advertisements layout element 203.

Cognitive efficiency score can be derived for individual page layout elements by following the calculation procedure outlined in FIG. 1, but instead of using the entire page, using just the fixation data from a given layout element. The aggregated gaze plot data 204 indicates the order in which individual layout elements of a page are perceived by a user. The cognitive efficiency score and the fixation data of individual layout elements is indicative of how much time the user spent on a given page section. Combining the fact that a user will spend a finite amount of effort on a given page, and the sequence in which a user will examine a given page layout elements, user's attention can be managed. The design of a page can be set up so that the user's attention is optimally directed to the search results section, and so that the user still has remaining effort to look at the sponsored ads in the finite window of the user's attention span.

Correlating Gaze Plot Data with Eye-Tracking Metrics

Figure 3:
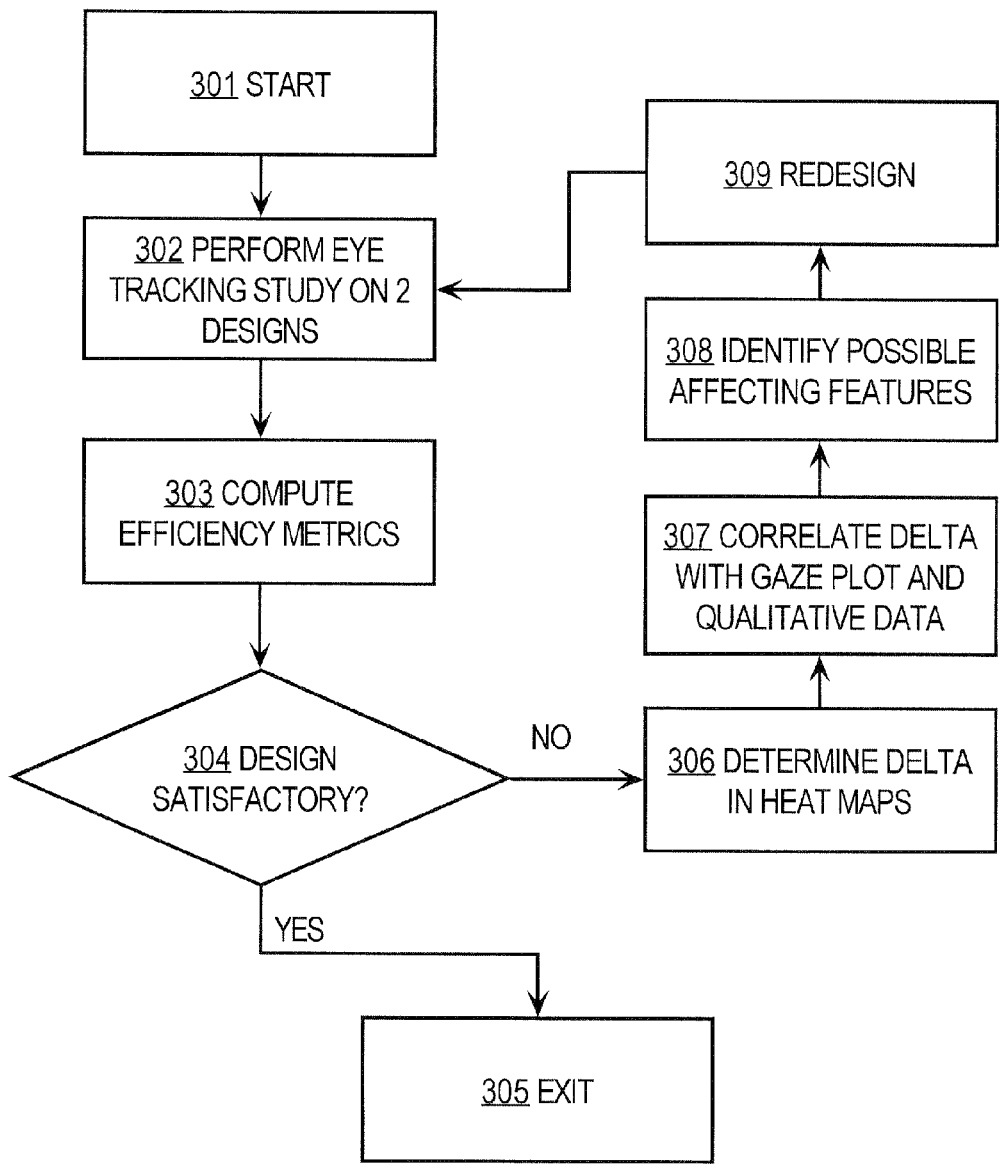
FIG. 3 depicts a typical layout of a web page, according to an embodiment of the current invention.

Eye-tracking metrics can also be used to compare and direct designs of web pages. In an embodiment of the invention, a procedure outlined in FIG. 3 is used to evaluate and to target modifications in a particular design of a search engine results page. Referring to FIG. 3, a candidate design is selected in step 301. An eye-tracking study is then performed, in step 302, on the original and candidate designs. The eye-tracking study includes videotaping users, capturing fixation, gaze plot data, click data, and also administering surveys. As part of the study, users bring in a list of query terms. Because the lists are of things in which the users are interested, the users are more invested in the search.

The searches do not need to be for the same term in order to come up with a representative distribution of fixations for a page layout design. There are multiple factors that affect how fixations are distributed over a page. For example, these factors may include such things as whether the numbering of search results has an effect, whether color has an effect, whether font has an effect, whether text bolding and the overall layout has an effect etc. Using the fixation data, a cognitive efficiency score is computed in step 303 as outlined in FIG. 1. The cognitive efficiency score is used as a parameter in evaluating whether the design is satisfactory in step 304. A certain threshold cognitive efficiency score could be established for a satisfactory design. If the design is satisfactory, or in other words it is sufficiently above the established cognitive efficiency score threshold, then the process exits in step 305. On the other hand, if the design is not satisfactory, the original and candidate designs are examined to identify all of the differences between the two designs in step 306. Fixation data for the two designs is analyzed in step 307. Fixation data can be analyzed using a combination of techniques. For example, fixation data from competing page designs can be divided into horizontal and vertical strips. For every vertical and horizontal strip the number of fixations is aggregated. The fixation data in strips gives a horizontal and vertical profile of how users distributed the attention span over a page. Alternatively, fixation data for original and candidate design can be used to create a heat map. Areas where vertical and horizontal strips as well as a heat maps differ between the original and candidate designs are used to select differences in the designs identified in step 306 as possible features effecting user attention. The resulting list of features affecting user attention is further narrowed by using gaze plots and qualitative data in step 308. Gaze plot data shows how the focus point traversed a given page, the points where the gaze anchored serves as an indicator of a feature that the user considered dynamic. Qualitative data is collected, while reviewing a video transcript of the study. Answers to questions such as "Why did you look here?" can then be targeted at a particular instance in time and further filter the list of features affecting user attention. A page is then redesigned in step 309, in part altering the features identified in step 308. The altered design can then undergo the same design cycle starting by performing, in step 302, an eye-tracking study.

Hardware Overview

Figure 4:
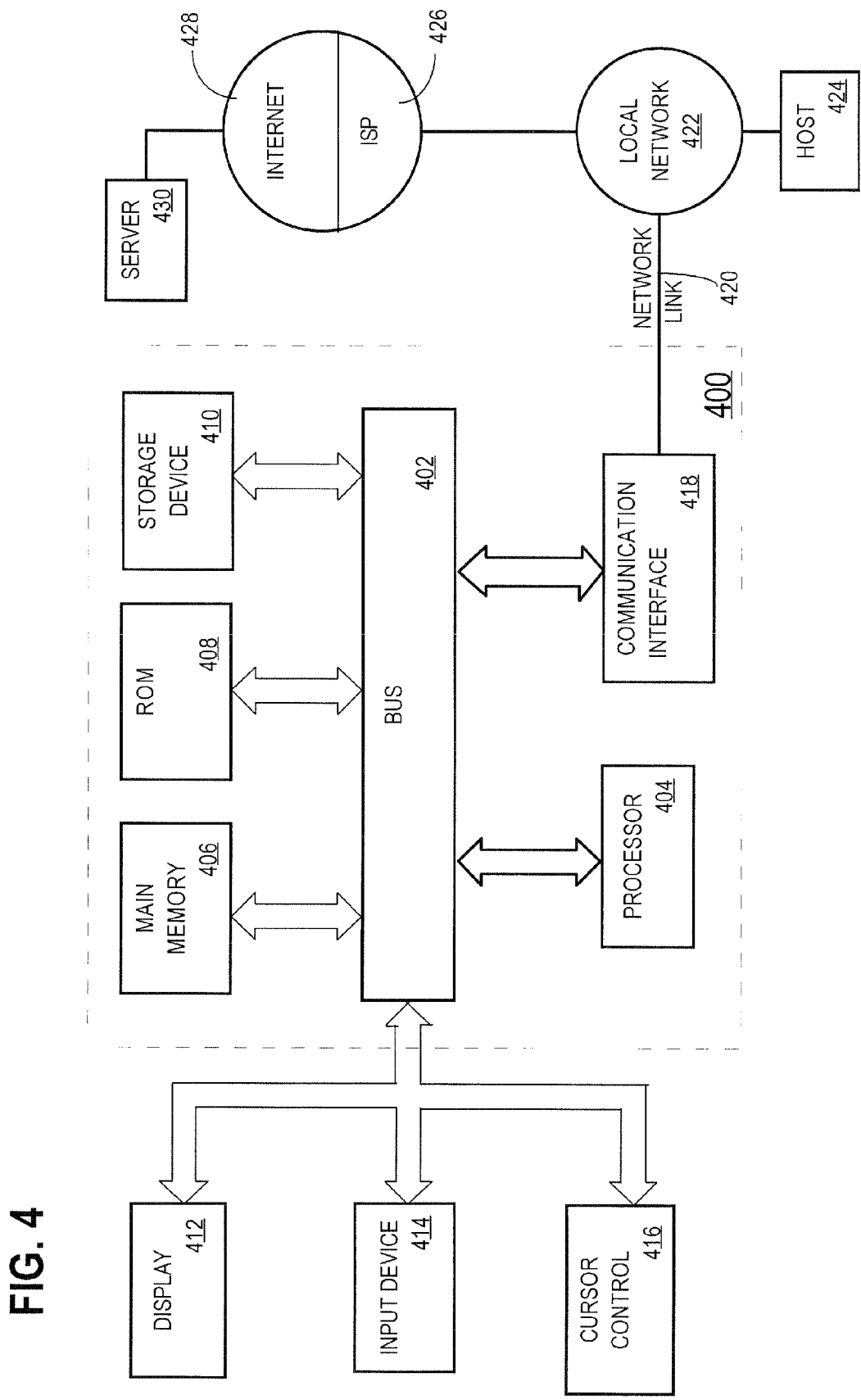
FIG. 4 is a diagram of a computer system that can be used to derive a cognitive efficiency score, according to an embodiment of the current invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for generating a cognitive efficiency score of a page derived from eye fixation data for a page, the method comprising steps of:
    dividing eye fixation data for a first page into a grid;
    determining a number of eye fixations for each grid element of the eye fixation data;
    establishing a threshold number of fixations above which a grid element is deemed to be seen;
    establishing a threshold number of fixations above which a grid element is deemed to be noticed;
    counting a number of seen grid elements and a number of noticed grid elements in said eye fixation data for said first page; and
    producing a first cognitive efficiency score of said first page based in part on of the number of seen grid elements and the number of noticed grid elements
    wherein the step of producing said first cognitive efficiency score includes computing a ratio of the number of seen grid elements to the number of noticed grid elements;
    producing a second cognitive efficiency score of a second page based in part on a number of seen grid elements and a number of noticed grid elements on the second page;
    wherein said second page contains the same information as said first page but is designed differently than said first page;
    wherein the steps are performed by one or more computing devices.

2. The method of claim 1 wherein the eye fixation data is collected from multiple users viewing both said first page and said second page.

3. The method of claim 1 wherein the eye fixation data is collected for a search engine result page, wherein the first page and the second page are both search engine result pages.

4. The method of claim 1 wherein the eye fixation data is collected for multiple classes of search engine queries, and wherein producing the first cognitive efficiency score comprises calculating the first cognitive efficiency score based at least in part on proportions of query terms classes derived from log data.

5. The method of claim 1 wherein the eye fixation data for the first page is for a single class of queries.

6. A non-transitory computer-readable medium carrying one or more sequences of instructions which, when executed by one or more processors, causes the one or more processors to perform the method recited in claim 1.

7. A non-transitory computer-readable medium carrying one or more sequences of instructions which, when executed by one or more processors, causes the one or more processors to perform the method recited in claim 2.

8. A non-transitory computer-readable medium carrying one or more sequences of instructions which, when executed by one or more processors, causes the one or more processors to perform the method recited in claim 3.

9. A non-transitory computer-readable medium carrying one or more sequences of instructions which, when executed by one or more processors, causes the one or more processors to perform the method recited in claim 4.

10. A non-transitory computer-readable medium carrying one or more sequences of instructions which, when executed by one or more processors, causes the one or more processors to perform the method recited in claim 5.

11. The method of claim 1, further comprising:
    in response to determining that the first cognitive efficiency score is less than a particular threshold but that the second cognitive efficiency score is greater than the particular threshold, determining how a design of the first page is different from a design of the second page, and determining which design aspects of the first page affected user attention;
    modifying design aspects of the second page based on said determination of which design aspects of the first page affected user attention, thereby producing a re-designed second page; and
    performing additional eye fixation studies relative to said re-designed second page.

12. A non-transitory computer-readable medium carrying one or more sequences of instructions which, when executed by one or more processors, causes the one or more processors to perform the method recited in claim 11.

* * * * *